US010207803B2

(12) United States Patent
Bonazzoli et al.

(10) Patent No.: US 10,207,803 B2
(45) Date of Patent: *Feb. 19, 2019

(54) PACKAGE DELIVERY AND RECEPTION WITH DRONES

(71) Applicant: International Business Machines Corporation, Armonk, NY (US)

(72) Inventors: Simone Bonazzoli, Rome (IT); Marco Borgianni, Rome (IT); Claudio Falcone, Rome (IT); Alessio Fioravanti, Rome (IT); Giuseppe Longobardi, Naples (IT); Silvano Lutri, Rome (IT); Luigi Presti, L'Aquila (IT); Paolo Salerno, Rome (IT); Alessandro Tomasi, Aprilia (IT); Francesca Ziantoni, Rome (IT)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/730,791

(22) Filed: Oct. 12, 2017

(65) Prior Publication Data

US 2018/0044018 A1 Feb. 15, 2018

Related U.S. Application Data

(63) Continuation of application No. 14/931,891, filed on Nov. 4, 2015, now Pat. No. 9,926,078.

(51) Int. Cl.
*B64D 1/08* (2006.01)
*B64C 39/02* (2006.01)

(52) U.S. Cl.
CPC .............. *B64D 1/08* (2013.01); *B64C 39/024* (2013.01); *B64C 2201/027* (2013.01);
(Continued)

(58) Field of Classification Search
CPC .... G05D 1/0088; G05D 1/0202; G06Q 50/28; B64C 2201/00
See application file for complete search history.

(56) References Cited

U.S. PATENT DOCUMENTS

| 9,536,216 B1 | 1/2017 | Lisso |
| 2014/0025229 A1 | 1/2014 | Levien et al. |

(Continued)

FOREIGN PATENT DOCUMENTS

| WO | 2014080389 A2 | 5/2014 |
| WO | 2014080390 A2 | 5/2014 |

OTHER PUBLICATIONS

IBM: List of IBM Patents or Patent Applications Treated As Related (Appendix P), Jan. 5, 2018, 2 pages.

(Continued)

*Primary Examiner* — Anshul Sood
(74) *Attorney, Agent, or Firm* — Michael A. Petrocelli (57) ABSTRACT

A computer program product for automatically delivering a physical mail includes receiving, by an unmanned aerial vehicle from an unmanned aerial vehicle management system, a delivery information, the delivery information includes information about a first secure mailbox and information about a second secure mailbox, the first secure mailbox being related to a first target user, delivering the physical mail to the first secure mailbox, and rerouting the unmanned aerial vehicle carrying the physical mail from the first secure mailbox to the second secure mailbox in response to the physical mail being delivered to the first secure mailbox.

8 Claims, 5 Drawing Sheets

(52) U.S. Cl.
CPC .. *B64C 2201/128* (2013.01); *B64C 2201/145* (2013.01); *B64C 2201/146* (2013.01)

(56) References Cited

U.S. PATENT DOCUMENTS

| | | |
|---|---|---|
| 2014/0032034 A1 | 1/2014 | Raptopoulos et al. |
| 2014/0254896 A1 | 9/2014 | Zhou et al. |
| 2015/0120094 A1 | 4/2015 | Kimchi et al. |
| 2015/0158599 A1 | 6/2015 | Sisko |
| 2015/0183528 A1 | 7/2015 | Walsh et al. |
| 2016/0033966 A1 | 2/2016 | Farris et al. |
| 2016/0200438 A1 | 7/2016 | Bokeno et al. |
| 2016/0257423 A1 | 9/2016 | Martin |
| 2017/0011340 A1 | 1/2017 | Gabbai |
| 2017/0038780 A1 | 2/2017 | Fandetti |
| 2017/0121021 A1 | 5/2017 | Bonazzoli et al. |

OTHER PUBLICATIONS

"Amazon Primeair", http://www.amazon.com/b?node=8037720011, Sep. 28, 2015, pp. 1-2.

PACKAGE DELIVERY AND RECEPTION WITH DRONES

BACKGROUND

The present invention generally relates to an automated delivery of physical mail packages, and more specifically, to a method, system and computer program product for automatically delivering and collecting physical mail to a first secure mailbox using unmanned aerial vehicles.

Mail package delivery and reception may be complicated for those outside their homes due to work or travel. In general, a recipient of physical mail may be required to be physically present to receive mail packages. Additionally, delivery services may indicate a time span during which they may deliver the physical package instead of a fixed time and date. As a consequence, recipients may need to waste valuable time waiting for the package to be delivered.

Attempts have been made to deliver packages by unmanned aerial vehicles (UAV) or drones. However, the drones may deliver the mail packages at a specified location without any control that the package was delivered to the right person. In addition, the service may not solve the problem of sending packages in a safe manner, since they may be generally brought to a regular post office for distribution. Moreover, some drone systems may allow package delivery only to a central station where the delivery to the correct mailbox is managed using a simple barcode. This, may not allow sending and receiving packages via drones to people not served by the central station.

SUMMARY

According to one aspect of the present invention, a method for automatically delivering and collecting physical mail to a first secure mailbox related to a first target user using an unmanned aerial vehicle may be provided. The method may include delivering the physical mail to the first secure mailbox by an unmanned aerial vehicle, the first secure mailbox may be adapted for receiving the physical mail as well as for storing physical mail to be collected by the unmanned aerial vehicle.

The method may also include storing information in a drone management system about the first secure mailbox and information about a second secure mailbox related to a second target user, and rerouting the unmanned aerial vehicle carrying the physical mail to be delivered to the first secure mailbox to the second secure mailbox if it is determined that the physical mail cannot be delivered to the first secure mailbox.

According to another aspect of the present invention, a package delivery system for automatically delivering and collecting physical mail to a first secure mailbox related to a first target user using an unmanned aerial vehicle may be provided. The package delivery system may include an unmanned aerial vehicle adapted for delivering the physical mail to the first secure mailbox. The first secure mailbox may be adapted for receiving the physical mail as well as for storing physical mail to be collected by the unmanned aerial vehicle. The package delivery system may also include a drone management system adapted for storing information about the first secure mailbox and information about a second secure mailbox relating to a second target user. The drone management system may also be adapted for rerouting the unmanned aerial vehicle carrying the physical mail to be delivered to the first secure mailbox to the second secure mailbox if it is determined that the first physical mail cannot be delivered to the first secure mailbox.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

BRIEF DESCRIPTION OF THE DRAWINGS

The following detailed description, given by way of example and not intended to limit the invention solely thereto, will best be appreciated in conjunction with the accompanying drawings, in which.

The drawings are intended to depict only typical embodiments of the invention. In respective figures, same or like reference numerals are used to represent the same or like components.

DETAILED DESCRIPTION

Some preferable embodiments will be described in more detail with reference to the accompanying drawings, where the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

In the context of this description, the following conventions, terms and/or expressions may be used:

The term 'physical mail' may denote a tangible physical object (e.g. a box) in which individual objects may be shipped to a target user, i.e., the recipient. Physical mail may also be collected from a location (e.g. physical address, mailbox, etc.) of the target user.

The term 'unmanned aerial vehicles (UAV) may denote an automatically flying device including, for example, a drone, a helicopter, a multi-copter, hexa-copter, octocopter or the like or a mixture of a drone and an airplane, e.g., a vertical take-off plane. A skilled person in the art may know which type of UAVs are suited for purposes of mail delivery. In any case, the UAV needs to be equipped with a mechanism to carry a physical package including, for example, a box. Additionally, the UAV needs to be equipped with a GPS (global positioning system) controller in order to determine its current location and plan a path to a target location. In some embodiments, the UAV may be operated with electrical power, rechargeable batteries and/or with a combustion engine. In embodiments in which the UAV is operated with electrical power, it may be generated using fuel cells. The UAV may also be equipped with a wireless sender and receiver to communicate with a central controller (hereinafter "drone management system" or "UAV management system"). Via the wireless sender and receiver, the UAV may receiving instructions from the drone management system including, for example, delivery addresses/coordinates, the wireless sender and receiver may also allow the UAV to report unexpected situations such as bad weather conditions or the inability to deliver a mail package to a target mailbox (for any unplanned reason), or any other malfunction. Additionally, the communication capacities (e.g., wireless sender and receiver) of the UAV may also be used to confirm a physical mail delivery or a collection of physical mail.

The term 'secure mailbox' may denote a housing including one or more lockable compartments. The secure mailbox may be positioned at a place that may be reached by the UAV. The one or more compartments may be individually lockable. The locking mechanism may be controlled by a mailbox controller. The secure mailbox may also be opened by a target person—e.g., using a key or a security code (using a smartcard or a code to be typed into a keyboard) or, the controller may send a signal to the locking mechanism of the compartment for opening the compartment after security credentials have been exchanged between the UAV and a receiver connected to the mailbox controller. This way, unauthorized access to the physical mail to be delivered to a target person may be prevented.

The term 'target user' may denote a recipient of a physical mail or package.

The term 'drone management system' may denote a central control system in which addresses/coordinates and mailbox locations/coordinates of one or more target users may be registered, as well as at least one alternative mailbox location/coordinate for each of the one or more target users. The drone management system may also store flight routes and delivery times of physical packages. It may also be used as an inventory management system for physical packages to be delivered from a central station to individual target users. Moreover, rerouting policies or rules for rerouting of physical mail may be stored by the drone management system.

It should be noted that a central drone/UAV management system may continuously track the status of a mail package to be delivered as well as mail packages to be collected from a target user. The central drone/UAV management system may also be aware of characteristics of individual mailboxes of target users as well as characteristics of specific compartments in a mailbox. In some situations, the UAV (e.g., the drone) may be instructed to fly to an alternate mailbox corresponding to a second potentially trusted target user, information related to the second potentially trusted target user may be previously specified by the first target user and recorded by the drone/UAV management system. One exemplary situation may include a mailbox of a first target user which may not accept additional packages. Another situation may include a mail package whose attributes may require a mailbox compartment of specific characteristics that may not be available.

The drone/UAV management system may be aware of such alternative mailboxes and the availability of fitting compartments—e.g., in size or regarding another attribute such as climate control. In current UAV package delivery/collection technologies, an UAV with a mail package to be delivered may not fly to a mailbox of a target user if it is determined that a required compartment is not available in the mailbox. In such a case, the UAV may be required to fly back to a central station without delivering the mail package.

According to the proposed method, the UAV/drone may be redirected to an alternative mailbox corresponding to a second target user, as described above. The second secure mailbox of the second target user may also include a second alternative mailbox of the first target user at a different landing station or location. Such an alternative mailbox and its coordinates may be available in the drone/UAV management system. However, it may also be possible to decide between alternative mailboxes based on a rules system available to the drone/UAV management system. The alternative mailbox may include, for example, a mailbox of a trusted person of the first target user.

It should be noted that various rules and/or policies stored in the UAV management system may consider other alternative mailboxes depending on, for example, distances, compartment size, package characteristics and other criteria. Additionally, in some embodiments, it may be decided interactively—by message exchange with the first target user—where to deliver the mail package. The drone/UAV management system may generate a list of alternative mailboxes which may be communicated to the first target user (using for example a smart mobile device, such as a smart phone) in order to select which alternative mailbox should be used to deliver the mail package.

Additionally, the UAV may also be adapted to collect physical mail packages from compartments of a mailbox of a target user. Furthermore, individual compartments of a mailbox may be lockable and may only be opened if the UAV and the mailbox, or a control system of the mailbox, may have exchanged security credentials successfully. For this purpose, it may be required that the drone/UAV management system and a controller of the mailbox are able to communicate using, for example, wireless technology.

It may also be noted that the constant communication between the drone/UAV management system, the UAV, and controllers of the secure mailboxes may substantially increase the probability of a guaranteed or successful delivery compared to known systems. The alternative secure mailboxes and the rerouting mechanism may be instrumental for a far higher rate of delivery if compared to those systems which are based on a fixed pick-up location and a fixed delivery location.

Additionally, the policy-based selection of an alternative secure mailbox, in case the secure mailbox of the first target user may not be available, allows for an automatic rerouting without any human intervention. The rerouting may be decided based on attributes of the content of the physical mail and attributes of the secure mailboxes and/or preferences and instructions of the first target user, which he/she made available to the drone/UAV management system.

Figure 1:
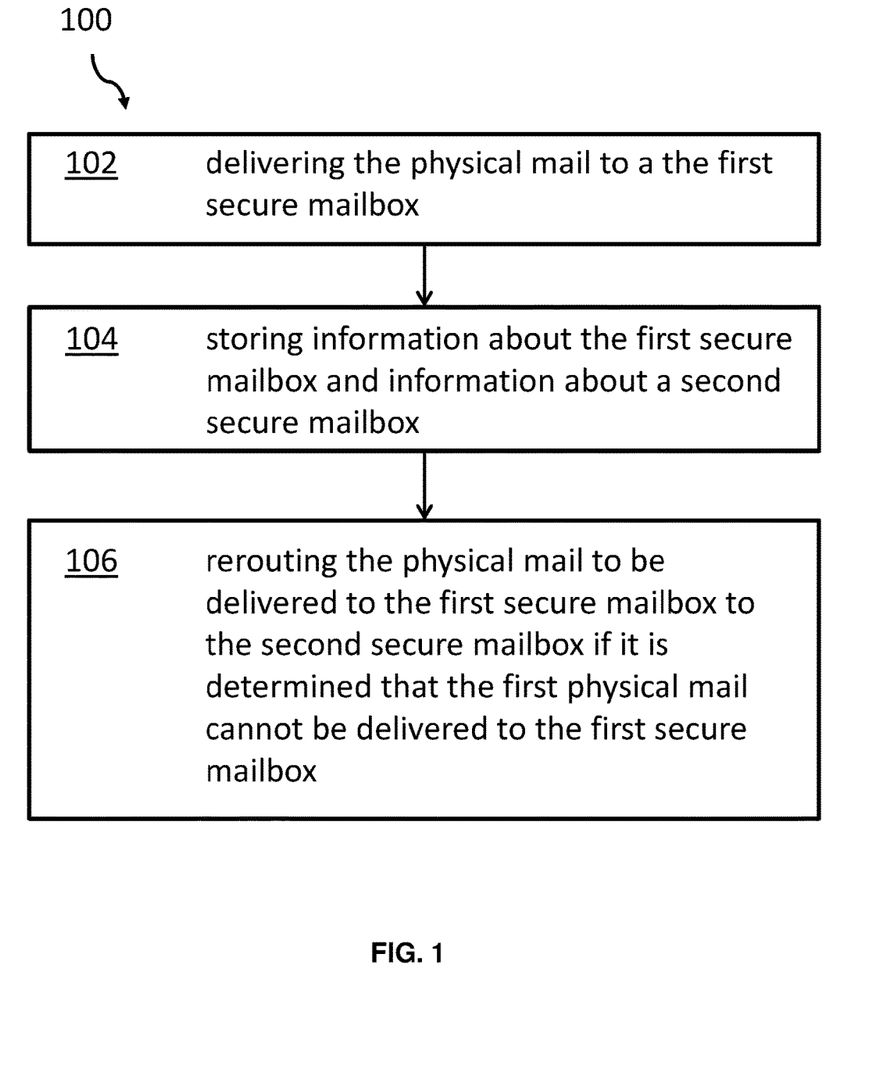
FIG. 1 depicts a flow chart describing the steps of a method for automatically delivering and collecting physical mail to a first secure mailbox related to a first target user using an unmanned aerial vehicle, according to an embodiment of the present disclosure.

Referring now to FIG. 1, a flow chart describing the steps of a method 100 for automatically delivering and collecting physical mail—in particular packages of boxes—using unmanned aerial vehicles (e.g., drones) to a first secure mailbox related to a first target user is shown, according to an embodiment of the present disclosure. The method 100 may include delivering, 102, the physical mail to the first secure mailbox by an unmanned aerial vehicle (UAV). The first secure mailbox may be adapted for receiving the physical mail, as well as for storing physical mail to be collected by the UAV. The method 100 may also include storing, 104, in a UAV management system, information about the first secure mailbox and information about a second secure mailbox related to a second target user.

Furthermore, the method may include rerouting, 106, the physical mail to be delivered from the first secure mailbox to the second secure mailbox, i.e., an alternative landing station if it is determined that the physical mail cannot be delivered to the first secure mailbox for whatever reason. For example, the mailbox compartments may be full, defect or blocked, or the target user may have filled the compartments with physical mail to be collected while the UAV was already on the way to the target user. Alternatively, the UAV may be rerouted before it takes off with the physical mail from a central station.

According to an advantageous embodiment of the method, the unmanned aerial vehicle may receive wirelessly GPS data from the UAV management system, in particular, data regarding the first secure mailbox and/or the second secure mailbox. The data may include, a flight route or no-go areas, information about a content class of the physical mail to be delivered (e.g., food to be cooled, different classes of privacy, etc.), security credentials (for authentication and opening of a compartment in the target mailbox), and a compartment identifier. It may also be ensured via the UAV management system that the secure mailbox or the respective controller may receive related security credentials which may be exchanged with the UAV before a physical delivery of the physical mail may be performed by the UAV, i.e., the drone may drop the package to be delivered into one of the compartments.

According to one preferred embodiment of the method, the second secure mailbox may be selected according to a predefined rerouting rule, in particular a rerouting policy. Information about such a policy may be available within the UAV management system because the first target user may have made available information about an alternative secure mailbox, i.e., a rerouting. The first target user may also identify different alternative secure mailboxes depending on the content class of the physical mail or security and/or privacy characteristics of an alternative secure mailbox.

If the content class indicates cooling requirements for the secure mailbox, only those secure mailboxes may be considered as alternative secure mailbox in order to fulfill the requirement for cooling of a compartment. If, on the other side, high security standards are required for a compartment, additional alternative secure mailboxes may be selected based on that they may be owned by other target users having a trusted relationship with the first target user.

According to an additional preferred embodiment of the method, the first secure mailbox and the second secure mailbox may each include a plurality of individually lockable compartments by the compartment identifier. Thus, a secure mailbox may be positioned at a landing station having specific GPS coordinates and the secure mailbox may only be opened by the related target user or the UAV after security credentials have been exchanged between the controller of the secure mailbox and the UAV. Both, the controller and the UAV, may have received the security credentials from the UAV management system individually. Only if the security credentials match or are compatible otherwise, the controller of the secure mailbox may enable an opening of a compartment in which the UAV may deliver the physical mail.

According to an optional embodiment, the method may include informing the UAV management system by the first secure mailbox via a communication channel between the secure mailbox and the UAV management system that physical mail is to be collected from the first mailbox. This physical mail may be positioned in a compartment of the secure mailbox. The UAV may include a docking device for collecting and carrying the physical mail.

According to a preferred embodiment of the method, the information about the first secure mailbox and the information about the second secure mailbox may include for each secure mailbox at least one attribute. The attribute may be, for example, a predefined rerouting rule, a maximum total capacity of the mailbox, a compartment attribute for each compartment of the mailbox, an actual free capacity, GPS data and an address data of the target user. Thus, the UAV management system may exchange parts of these data with the controller of the secure mailbox or, in other cases, the target user may have registered those characteristics when registering the mailbox together with other parameters (e.g., address, payment details, etc.) the first time.

According to one advantageous embodiment of the method, the compartment attribute may include, for example, a size of the mailbox, a filled status—in particular whether a specific compartment is empty or full—a cooling option which may be used for a delivery of temperature sensitive content of the physical mail—e.g., food—a trust status, and a collection status. The collection status may signal the UAV management system that in at least one of the compartments of a secure mailbox physical mail is available for collection. It may also be possible, that some compartments may have a higher security classification because, e.g., the locking relates to a higher security class. Thus, an alternative mailbox may only be selected if a security classification of the physical mail and the trust status of the alternative mailbox match.

According to a further preferred embodiment of the method, the rerouting to the second mailbox may be determined dynamically. This means that the UAV may already be on its way to the first secure mailbox. During flight time of the UAV it may be determined that the mail may not be delivered to the first secure mailbox—for a variety of reasons. It may turns out that all compartments of the secure mailbox are filled or the compartment may be defect or otherwise not usable. It may also happen that the target user may have placed physical mail to be collected in a compartment which was empty when the UAV left the central station for a delivery to the first secure mailbox.

In such a situation, and according to an optional embodiment of the method, a message may be dispatched or sent to the target user in case a rerouting may be required. Thus, the target user may be informed basically at the same time that a decision was made for a rerouting. The target user may have the option to decline a delivery to an alternative secure mailbox. Or he/she may—out of a list presented—select a specific alternative secure mailbox.

In other words, a confirmation may be requested by the UAV management system from a target user via a mobile device before it a rerouting is performed. The communication may be performed wirelessly, e.g., using the mobile telephone network and a smart device, like a smart phone, of the addressed target user.

According to an advantageous embodiment, the method may also include sending a list of one or more potential second, alternative, secure mailboxes for the UAV management system for rerouting to a smart device of the first target user. This may happen if no alternative secure mailbox may be known or available in the drone management system. The drone management system may then receive from the smart device of the first target user an identifier of a selected secure mailbox before the rerouting may be performed.

Thus, it may be ensured that even in cases in which all compartments of a target mailbox of a target user are not usable for mail delivery, the physical mail is delivered to an alternative mailbox at a different landing station. The first target user may also decline to receive the physical mail at an alternative, second secure mailbox.

Figure 2:
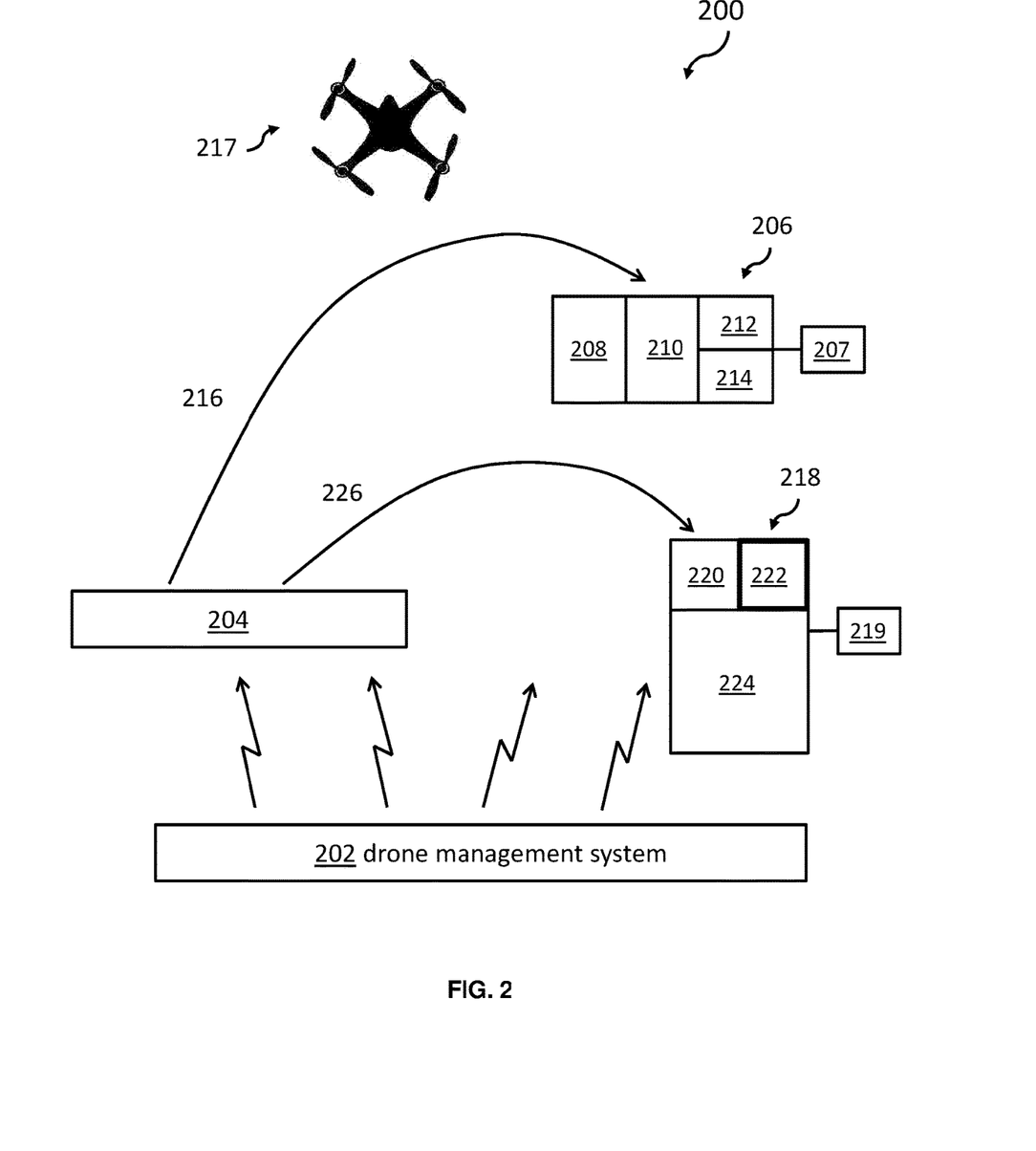
FIG. 2 depicts a block diagram of different physical units useful for executing the proposed method, according to an embodiment of the present disclosure.

Referring now to FIG. 2 a block diagram 200 of elements instrumental for performing the proposed method is shown, according to an embodiment of the present disclosure. The information hub to be used by all involved elements may typically include an UAV management system 202 (hereinafter "drone management system"). The drone management system 202 may, for example, hold information about physical mail to be delivered from a central station 204 to a mailbox 206 of a first target user, as well as, information about physical mail to be collected and its corresponding location, in particular in which secure mailbox the physical mail is located. In one embodiment, the secure mailbox 206 may have compartments of different sizes. For instance, the secure mailbox 206 may have two bigger compartments 208, 210 and two smaller compartments 212, 214. The drone management system 202 may also have information about a preferred flight route 216 of a UAV 217 from the central station 204 to the secure mailbox 206.

The drone management system 202 may also have information about a secure mailbox 218 of a second target user. In one embodiment, the secure mailbox 218 may have different sized compartments: two small compartments 220, 222 and a large compartment 224. In the Figure, the compartment 222 is shown with thicker walls to indicate that compartment 222 may be equipped with cooling facilities for a controlled temperature inside the compartment 222. The drone management system 202 may also have data about a preferred flight route 226 from the central station 204 to the secure mailbox 218 of a second target user.

It may be determined that physical mail should be delivered to the secure mailbox 206 of a first target user, the physical mail may be characterized by an attribute that the target compartment of the secure mailbox 206 needs to be climate controlled or may have a predefined trust level. As may be appreciated in FIG. 2, there is no climate controlled compartment in the secure mailbox 206 of the first target user. In this case, the drone management system 202 may automatically, based on a set of rules or policies, select an alternative mailbox, in this case mailbox 208 including compartment 222 with climate controlled capabilities. A confirmation may be required prior to selecting the alternative mailbox depending on the data related to the first target user stored in the drone management system 202.

It may also be noted that each secure mailbox 206, 218 may have a dedicated mailbox controller 207, 219 respectively. The mailbox controllers 207, 219 may communicate with the drone management system 202. Each of the mailbox controllers 207, 219 may support an authentication process between the UAV 217 and each secure mailbox 206, 218. In one embodiment, the mailbox controller 207 may receive data including security credentials from the drone management system 202. At the same time, a controller (not shown) in the UAV 217 may also receive corresponding security credentials for a specific delivery to a secure mailbox 206 from the drone management system 202.

In one embodiment, when the UAV 217 arrives at the secure mailbox 206, security credentials may be exchanged wirelessly using, for example, WiFi signals, NFC signals or another form of electromagnetic radiation or using any known type of light-based communication between the UAV 217 and a receiver of the respective mailbox controller 207. Only after the authentication process have been successfully completed, the mailbox controller 207 may enable or authorize an opening of one of the compartments 208, 210, 212, 214 that has been selected for physical mail delivery.

It may also be noted that on each package a unique code may be affixed—e.g., a barcode, a QR code, an RFID tag—for an identification of a specific physical mail. This code may be used by the drone management system 202 to relate a target user and a physical mail package. The UAV 217 may be equipped with a detector for the unique code. The UAV 217 may also receive the collection GPS coordinates for the physical package, e.g., within the central station 204. Also, a secure mailbox (e.g., secure mailboxes 206, 218) may have a visible unique code, thus, a confirmation for the correct secure mailbox may be determined based on the exchange of security credentials described above, as well as, a recognition of the mailbox code by the UAV 217. The UAV 217 may also inform the drone management system 202 about a secure delivery of the physical mail such that an increased level of security in the mail delivery process may be achieved.

A selection of an alternative mailbox, such as the secure mailbox 218, may also be based on a distance between the secure mailbox 206 of the first target user and a second alternative secure mailbox (secure mailbox 218).

In one embodiment, when the UAV 217 delivers a physical mail to a target secure mailbox (e.g., secure mailboxes 206, 218), the associated mailbox controller 207, 219 may inform the drone management system 202 about the reception of the physical mail. Simultaneously, the target user may receive a message via a smart device confirming that the physical mail has been delivered to the secure mailbox 206 or, in case a delivery to an alternative secure mailbox was required, the location of the alternative secure mailbox (e.g. secure mailbox 218).

In some embodiments, alternative secure mailboxes may be selected based on privacy settings of the alternative secure mailboxes and an attribute of the physical mail to be delivered. It should be noted that not all available alternative secure mailboxes (e.g., secure mailbox 218) may have a privacy status in line with a security attribute of the physical mail to be delivered.

Figure 3:
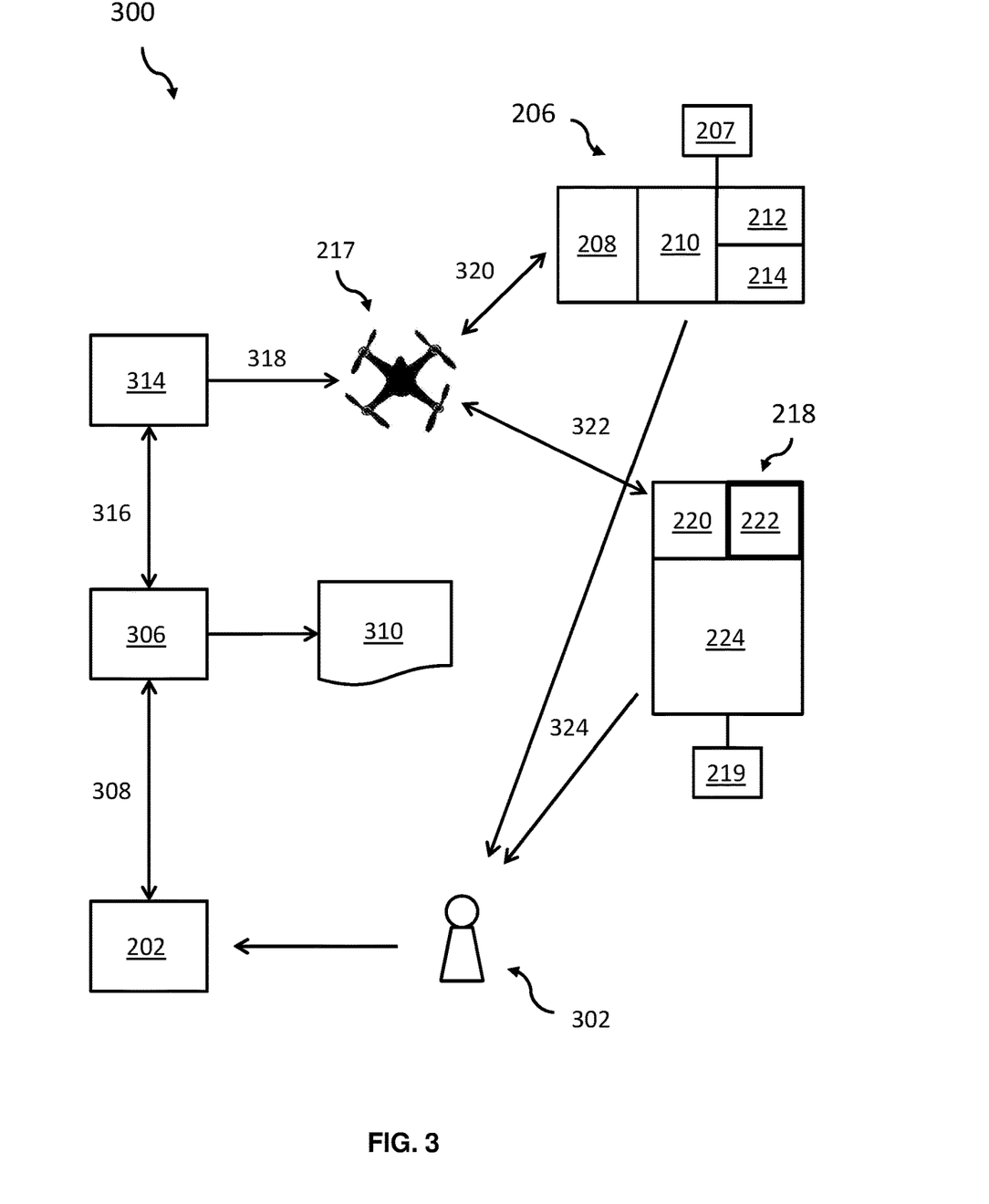
FIG. 3 depicts a block diagram of an alternate configuration of physical units useful for executing the proposed method, according to an embodiment of the present disclosure.

Referring now to FIG. 3, an alternate block diagram 300 of elements instrumental for performing the proposed method is shown, according to an embodiment of the present disclosure. Initially, a first target user 302 may need to interact with the drone management system 202. Different types of interaction may occur, for example: the target user 302 may register for the service of delivery of physical mail using UAVs or he/she may inform the drone management system 202 about mail to be collected or to be shipped to his/hers secure mailbox 206. Additionally, payment details and other personal data may be exchanged.

Part of the drone management system 202 may be a storage system 306 with which the drone management system 202 is in constant electronic communication 308. Here, delivery tables 310 may be produced, stored and managed. The delivery tables 310 may include transportation goods, target users, delivery locations, primary and secondary mailboxes, etc.

The drone management system 202 may instruct—based on information of the storage system 306—the UAV 217 via a drone communication system 314 about packages to be collected from the central station 204 (FIG. 2), an attribute of the physical mail, GPS coordinates of a secure mailbox 206 where the physical mail should be delivered and other operational data. The data may flow, 316, from the drone management system 202 and the storage system 306 to the drone communication system 314 and from a secure mail wirelessly to the UAV 217 (318). After the UAV 217 collects the physical mail to be delivered from a central station (e.g., central station 204 in FIG. 2), the UAV 217 may fly, 320, to the secure mailbox 206 of the first target user 302. Normally, the UAV 217 may deliver the physical mail to one of the compartments 208, 210, 212, 214 depending on the information received via the drone communication system 314. In one embodiment, the UAV 217 may also collect physical mail from one of the compartments 208, 210, 212, 214 of the secure mailbox 206 and carry it to the central station 204 (FIG. 2) or directly to a secure mailbox 218 of another target user.

As described above, the UAV 217 may be rerouted, 322, to an alternative secure mailbox 218 of a second target user for a delivery of the physical mail at this alternative secure mailbox 218. A decision about a rerouting may be made before the UAV 217 leaves the central station 204 (FIG. 2) because it may already be known—based on a communication from the mailbox controller 207 to the drone management system 202—that the secure mailbox 206 of the first target user 302 may not be in a position to accept the physical mail. Or, the decision for rerouting may be made during the flight time of the UAV 217 from the central station 204 (FIG. 2) to the first secure mailbox 206 based on a selection or intervention of the first target user 302 or based on a policy-driven rerouting plan.

After the UAE 217 delivers the physical package/mail to either the secure mailbox 206 or the alternative secure mailbox 218, the target user 302 may collect, 324, the physical mail.

Figure 4:
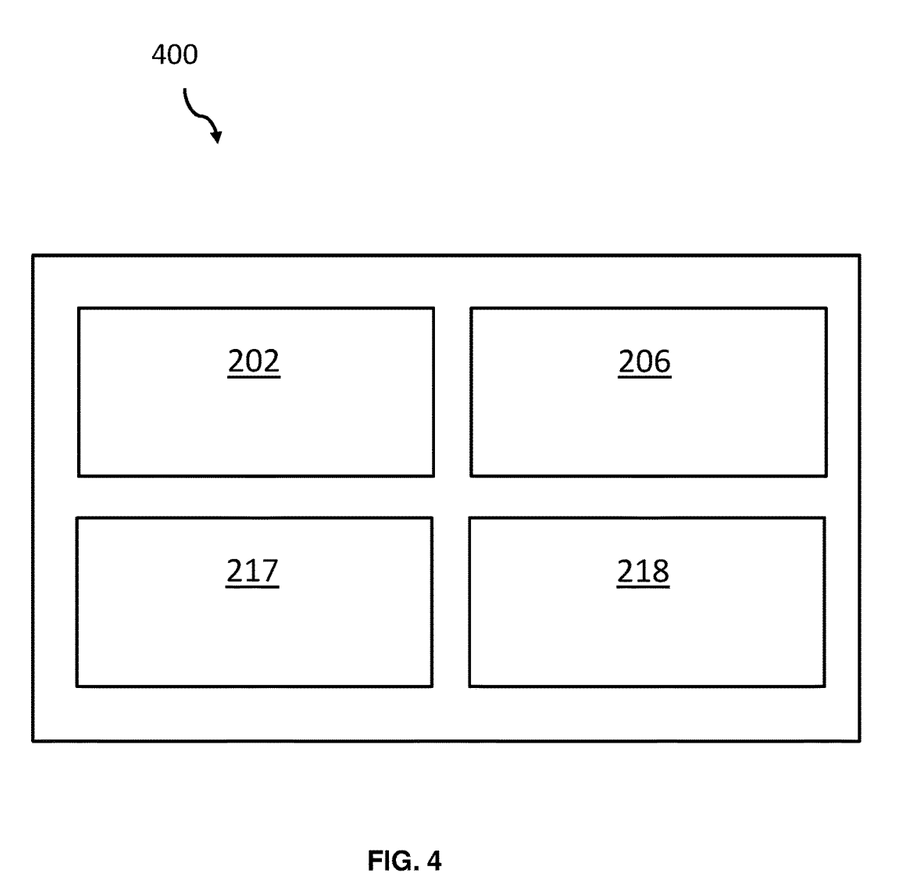
FIG. 4 depicts elements of the package delivery system for automatically delivering and collecting physical mail using unmanned aerial vehicles, according to an embodiment of the present disclosure.

Referring now to FIG. 4, a package delivery system 400 for automatically delivering and collecting physical mail using an unmanned aerial vehicle 217 is shown, according to an embodiment of the present disclosure. The package delivery system 400 comprises an unmanned aerial vehicle 217 adapted for delivering the physical mail to a first secure mailbox 206. The first secure mailbox 206 should be adapted for receiving the physical mail, as well as for storing physical mail to be collected by the unmanned aerial vehicle 217. Another essential component is the drone management system 202 adapted for storing information about the first secure mailbox 206 and information about a second secure mailbox 218 related to a second target user (not shown). The drone management system 202 may be adapted for rerouting the unmanned aerial vehicle 217 carrying the physical mail to be delivered to the first secure mailbox 206 to the second secure mailbox 218 if it is determined that the physical mail cannot be delivered to the first secure mailbox 206. Stated differently, rerouting the unmanned aerial vehicle 217 carrying the physical mail from the first secure mailbox 206 to the second secure mailbox 218 may occur in response to the physical mail being delivered to the first secure mailbox 206.

Figure 5:
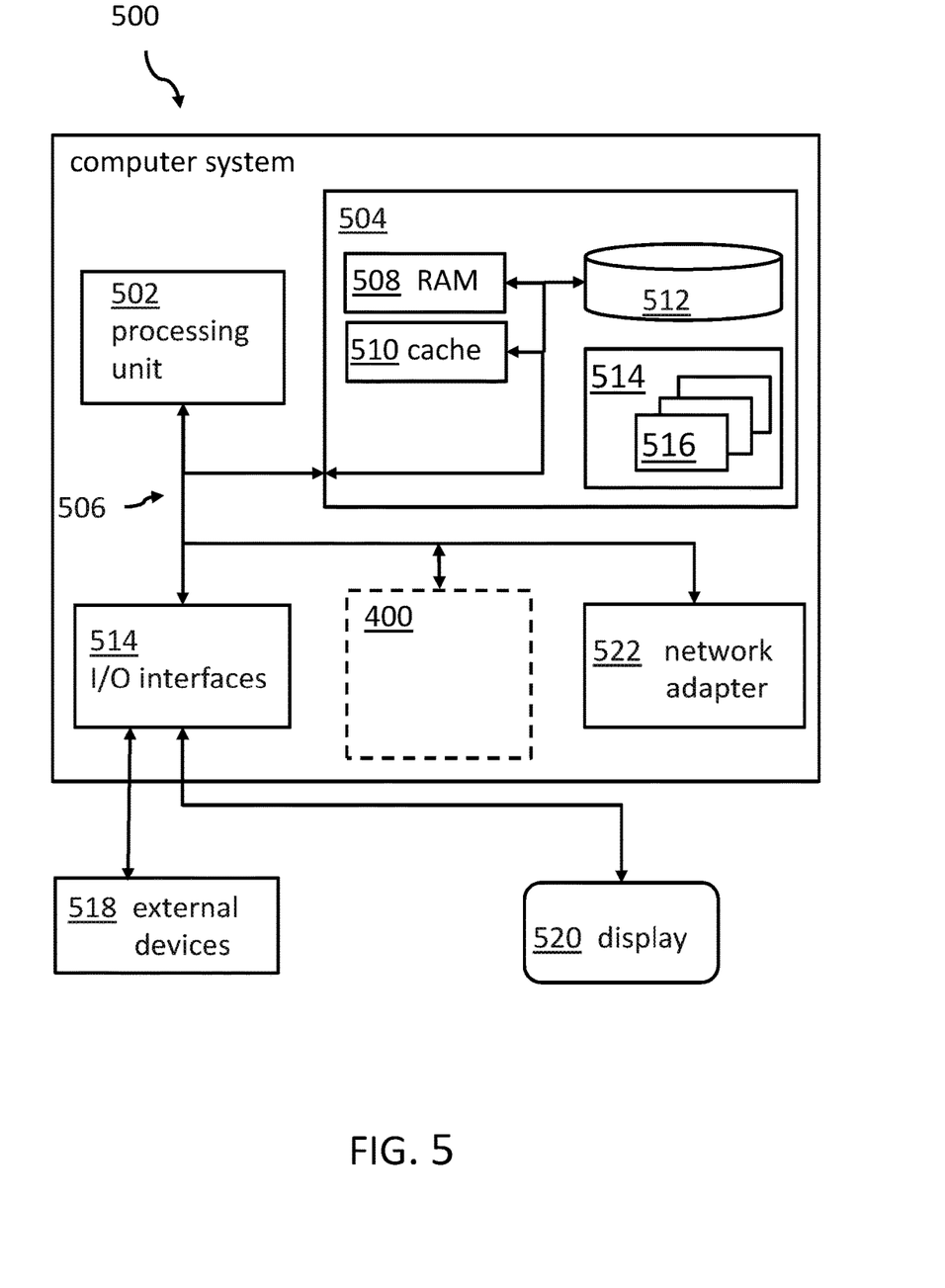
FIG. 5 depicts a computing system including the drone management system, according to an embodiment of the present disclosure.

Referring now to FIG. 5, an exemplary computing system 500 suitable for executing a program code related to the proposed method is shown, according to an embodiment of the present disclosure. It should be noted that embodiments of the invention may be implemented together with virtually any type of computer, regardless of the platform being suitable for storing and/or executing program code.

The computing system 500 is only one example of a suitable computer system and is not intended to suggest any limitation as to the scope of use or functionality of embodiments of the invention described herein. Regardless, the computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both local and remote computer system storage media including memory storage devices.

As shown in the Figure, computer system/server 500 is shown in the form of a general-purpose computing device. The components of computer system/server 500 may include, but are not limited to, one or more processors or processing units 502, a system memory 504, and a bus 506 that couples various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random access memory (RAM) 508 and/or cache memory 510. Computer system/server 500 may further include other removable/non-removable, volatile/non-volatile computer system storage media. By way of example only, storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, memory 504 may include at least one program product having a set (e.g., at least one) of program modules that are configured to carry out the functions of embodiments of the invention.

Program/utility 514, having a set (at least one) of program modules 516, may be stored in memory 504 by way of example, and not limitation, as well as an operating system, one or more application programs, other program modules, and program data. Each of the operating system, one or more application programs, other program modules, and program data or some combination thereof, may include an implementation of a networking environment. Program modules 516 generally carry out the functions and/or methodologies of embodiments of the invention as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of computer system/server 500 via bus 506. It should be understood that although not shown, other hardware and/or software components could be used in conjunction with computer system/server 500. Examples, include, but are not limited to: microcode, device drivers, redundant processing units, external disk drive arrays, RAID systems, tape drives, and data archival storage systems, etc.

Additionally, the drone management system 202 (FIG. 2) or parts thereof may be attached to the bus system 506.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer program product for automatically delivering a physical mail, the computer program product comprising:
    a computer readable non-transitory article of manufacture tangibly embodying computer readable instructions which, when executed, cause a computer to carry out a method comprising:
sending, from an unmanned aerial vehicle management system, a delivery information to a unmanned aerial vehicle carrying the physical mail, the delivery information comprises information about a first secure mailbox and information about a second secure mailbox, the first secure mailbox being related to a first target user;
    delivering, by the unmanned aerial vehicle, the physical mail to the first secure mailbox;
    in response to the unmanned aerial vehicle not being able to deliver the physical mail to the first secure mailbox, receiving a rerouting information associated with the second secure mailbox from the unmanned aerial vehicle management system, wherein the rerouting information to the second secure mailbox is based on a predefined rerouting rule;
    sending, by the unmanned aerial vehicle management system, a message to the first target user requesting a confirmation of the rerouting information;
    in response to the first target user accepting the rerouting information, rerouting the unmanned aerial vehicle carrying the physical mail from the first secure mailbox to the second secure mailbox, wherein the second secure mailbox comprises a plurality of individually lockable compartments controlled by a mailbox controller that is able to communicate with the unmanned aerial vehicle management system;
sending, from the unmanned aerial vehicle management system, to the mailbox controller in the second secure mailbox one or more security credentials associated with the unmanned aerial vehicle;
    simultaneously sending, from the unmanned aerial vehicle management system, to the unmanned aerial vehicle one or more security credentials associated with the second secure mailbox;
    exchanging the one or more security credentials associated with the unmanned aerial vehicle and the one or more security credentials associated with the second secure mailbox; and in response to the one or more security credentials matching, opening at least one compartment of the plurality of individually lockable compartments to deliver the physical mail.

2. The computer program product of claim 1, further comprising:
receiving, by the unmanned aerial vehicle, global positioning system data of the first secure mailbox and the second secure mailbox, information about a content class of the physical mail to be delivered, security credentials, and a compartment identifier.

3. The computer program product of claim 1, wherein the rerouting rule is based on:
a content class of the physical mail;
a compartment attribute of the first secure mailbox and a compartment attribute of the second secure mailbox, wherein each compartment attribute comprises a size, a filled status, a cooling option, a trust status, or a collection status; and
preferences and instructions provided by the first target user to the unmanned aerial vehicle management system.

4. The computer program product of claim 1, wherein the plurality of individually lockable compartments are identifiable by a compartment identifier, wherein each compartment is adapted for receiving and storing the physical mail.

5. The computer program product of claim 1, further comprising:
sending a request to the unmanned aerial vehicle for physical mail collection from the first secure mailbox.

6. The computer program product of claim 1, wherein each of the information about the first secure mailbox and the information about the second secure mailbox is stored by the unmanned aerial vehicle management system, the information comprises the predefined rerouting rule, a maximum total capacity, an actual free capacity, GPS data and an address data of the first target user.

7. The computer program product of claim 1, wherein the information about the first secure mailbox and the information about the second secure mailbox stored by the unmanned aerial vehicle management system further comprises a compartment attribute for each compartment of the first secure mailbox and the second secure mailbox.

8. The computer program product of claim 1, further comprising:
in response to the first target user rejecting the rerouting information, presenting a list of alternative secure mailboxes to the first target user, wherein the list of alternative secure mailboxes is in accordance with the predefined rerouting rule; and
in response to the user selecting a third secure mailbox from the list of alternative mailboxes, rerouting the unmanned aerial vehicle to the third secure mailbox.

* * * * *